US007623949B2

(12) United States Patent
Nou

(10) Patent No.: US 7,623,949 B2
(45) Date of Patent: Nov. 24, 2009

(54) SYSTEM AND METHOD FOR CONTROLLING REMOTE VEHICLE USING TELEMATICS SYSTEM

(75) Inventor: Seong Taeg Nou, Icheon-Shi (KR)

(73) Assignee: Hyundai Autonet Co., Ltd., Icheon-Shi Kyungki-Do (KR)

( * ) Notice: Subject to any disclaimer, the term of this patent is extended or adjusted under 35 U.S.C. 154(b) by 911 days.

(21) Appl. No.: 11/161,041

(22) Filed: Jul. 20, 2005

(65) Prior Publication Data

US 2006/0293813 A1 Dec. 28, 2006

(30) Foreign Application Priority Data

Dec. 4, 2004 (KR) ...................... 10-2004-0101550

(51) Int. Cl.
*G01M 17/00* (2006.01)

(52) U.S. Cl. ............................... 701/33; 701/2; 701/29; 340/539.13; 709/249

(58) Field of Classification Search ..................... 701/2, 701/29, 33, 36; 340/10.41, 539.13; 455/3.01; 709/249
See application file for complete search history.

(56) References Cited

U.S. PATENT DOCUMENTS 6,169,943 B1 * 1/2001 Simon et al. .................. 701/29
7,484,008 B1 * 1/2009 Gelvin et al. ............... 709/249
2006/0123053 A1 * 6/2006 Scannell .................. 707/104.1
2006/0293813 A1 * 12/2006 Nou ............................ 701/33
2007/0027595 A1 * 2/2007 Nou ............................ 701/36
2007/0050191 A1 * 3/2007 Weider et al. ............... 704/275
2007/0290793 A1 * 12/2007 Tran .......................... 340/5.64
2008/0055050 A1 * 3/2008 Brown ..................... 340/10.41
2008/0161989 A1 * 7/2008 Breed .......................... 701/29
2009/0061852 A1 * 3/2009 Feher ...................... 455/426.1
2009/0076803 A1 * 3/2009 Feher ......................... 704/201
2009/0167524 A1 * 7/2009 Chesnutt et al. ......... 340/539.19
2009/0177352 A1 * 7/2009 Grau et al. ..................... 701/33
2009/0190735 A1 * 7/2009 Gilmartin et al. ....... 379/201.12
2009/0197593 A1 * 8/2009 Farrell et al. ............. 455/426.1

FOREIGN PATENT DOCUMENTS

AU 200078718 A * 5/2001
EP 1069535 A2 * 1/2001

(Continued)

OTHER PUBLICATIONS

Hickling, R.M.: "New technology facilitates true software -defined radio"RF Design Magazine Apr. 2005, www.rfdesign.com (5 pages.). cited by other.*

(Continued)

*Primary Examiner*—Cuong H Nguyen
(74) *Attorney, Agent, or Firm*—IPLA P.A.; James E. Bame

(57) ABSTRACT

A system and method for controlling a remote vehicle using a telematics system is provided. In the system and method, a communication terminal, such as a personal computer, a PDA (Personal Digital Assistants), a cell phone, and a line telephone set, is connected to a service providing center of the telematics system to diagnose and check a status of a vehicle equipped with a telematics terminal, thereby controlling functions of the vehicle.

27 Claims, 4 Drawing Sheets

FOREIGN PATENT DOCUMENTS

| | | | | |
|---|---|---|---|---|
| JP | 09159581 | A | * | 6/1997 |
| JP | 2004131999 | A | * | 4/2004 |
| JP | 2006132229 | A | * | 5/2006 |
| KR | 2002064448 | A | * | 8/2002 |
| KR | 397756 | B | * | 9/2003 |
| KR | 1020040035290 | | | 4/2004 |
| KR | 1020040035295 | | | 4/2004 |
| KR | 1020040035297 | | | 4/2004 |
| KR | 1020040033101 | | | 10/2004 |
| KR | 2009044651 | A | * | 5/2009 |
| WO | WO 0126337 | A2 | * | 4/2001 |

OTHER PUBLICATIONS

Transactions on Circuits and Systems for Video Technology, pp. 215-224; vol. 6, No. 2, Apr. 1996 (10pages). cited by other.*

Holma, H., Toskala, A.: "WCDMA for UMTS Radio Access for Third Generation Mobile Communications", Second Edition, John Wiley & Sons Ltd, . cited by other.*

Development of information platform server for telematics service provider; Mi-Jeong Kim; Eunkyu Lee; Minsoo Kim; Inhak Joo; Geoscience and Remote Sensing Symposium, 2005. IGARSS '05. Proceedings. 2005 IEEE International; vol. 3, Jul. 25-29, 2005 pp. 1598-1601; Digital Object Identifier 10.1109/IGARSS.2005. 1526301.*

Design and implementation of a J2EE platform to handle standardized telematics emergency calls originated from vehicles; Luque, J.L.; Ferrer, X.C.; Serra, X.H.; Personal, Indoor and Mobile Radio Communications, 2004. PIMRC 2004. 15th IEEE International Symposium on, vol. 4, Sept. 5-8, 2004 pp. 2825-2829 vol. 4.*

A study on user authentication infrastructure for next generation telematics; Umezawa, K.; Susaki, S.; Kashiyama, M.; Tezuka, S.; Vehicular Electronics and Safety, 2008. ICVES 2008. IEEE International Conference on; Sept. 22-24, 2008 pp. 38-44 Digital Object Identifier 10.1109/ICVES.2008.4640865.*

Plug-In Hybrid Market Transformation by Leveraging a Niche Market: School Buses; Sadiq, S.; Pritchard, E.; Dulaney, K.; Emadi, A.H.; Vehicle Power and Propulsion Conference, 2007. VPPC 2007. IEEE; Sep. 9-12, 2007 pp. 483-492 Digital Object Identifier 10.1109/VPPC.2007.4544173.*

A study on an authentication infrastructure between terminal and asp for next generation telematics; Umezawa, K.; Susaki, S.; Kashiyama, M.; Tezuka, S.; ITS Telecommunications, 2008. ITST 2008. 8th International Conference on; Oct. 24-24, 2008 pp. 67-71; Digital Object Identifier 10.1109/ITST.2008.4740229.*

Integration of an advanced emergency call subsystem into a car-gateway platform; Madrid, N.M.; Seepold, R.; Nieves, A.R.; Gomez, J.S.; los Santos Aransay, A.; Velasco, P.S.; Morales, C.R.; Ares, F.; Design, Automation & Test in Europe Conference & Exhibition, 2009. DATE '09. Apr. 20-24, 2009 pp. 1100 -1105.*

A performance model for software focused supply chains; Ma, M.; Yuan, X.-M.; Industrial Informatics, 2005. INDIN '05. 2005 3rd IEEE International Conference on, Aug. 10-12, 2005 pp. 192-197, Digital Object Identifier 10.1109/INDIN.2005.1560375.*

Cardiac Sentinel: A smart GSM based embedded solution for continuous remote monitoring of cardiac patients; Sieber, A.; Yong, X.; L'Abbate, A.; Bedini, R.; Intelligent Solutions in Embedded Systems, 2008 International Workshop on; Jul. 10-11, 2008 pp. 1-11; Digital Object Identifier 10.1109/WISES.2008.4623296.*

21st International Conference on Advanced Information Networking and Applications Workshops-TOC; Advanced Information Networking and Applications Workshops, 2007, AINAW '07. 21st International Conference on; vol. 2, May 21-23, 2007 pp. :v-xv ; Digital Object Identifier 10.1109/AINAW.2007.8.*

Quality Control information system for immunology/ serology tests in medical laboratories; Al-Taee, M.A.; Souan, L.; Al-Haj, A.; Mohsen, A.; Muhsin, Z.J.; Systems, Signals and Devices, 2009. SSD '09. 6th International Multi-Conference on; Mar. 23-26, 2009 pp. 1 -7; Digital Object Identifier 10.1109/SSD.2009.4956820.*

* cited by examiner

SYSTEM AND METHOD FOR CONTROLLING REMOTE VEHICLE USING TELEMATICS SYSTEM

BACKGROUND OF THE INVENTION

1. Field of the Invention

The present invention relates to a telematics system, and more particularly, to a system and method for controlling a remote vehicle using a telematics system, in which the vehicle equipped with the telematics system can be diagnosed and checked in status using a communication terminal at a remote place, and its operation can be controlled depending on the diagnosed status.

2. Description of the Related Art

In recent years, a telematics system is one of technologies attracting attention. The telematics system detects occurrence of vehicle accident or theft, guides a vehicle running path, and provides a vehicle driver with a variety of other information using a mobile communication method and a position tracing method associated with Internet. In other words, the telematics system provides information through a vehicle based on a Global Positioning System (GPS) using a mobile communication system and a GPS satellite. Accordingly, the telematics system is expected to provide a variety of mobile communication services, such as traffic information, countermeasure to an emergency situation, remote vehicle diagnosis, the use of Internet (for example, financial transaction, provision of news, and transmission and reception of e-mail), using the GPS, a wireless communication network and an Internet network.

One of the reasons why the telematics system attracts attention is that it creates a newly conceptive value added service, which is able to maximize a synergy effect by merging an automobile industry with an Information Telecommunication (IT) industry.

Accordingly, a standardization group of telematics is provided. In the standardization group, there are being standardized an operation and a function of each constituent part of the telematics system, a communication protocol between the constituent parts, and services using a communication network.

If a telematics service is realized, a car can be reconstructed through a wire or wireless communication and broadcasting network, using Internet, which is a third space following an office space and a home space, and can be associated with home networking and office automation through a hetero communication and broadcasting network and an intelligent terminal, thereby providing a service for home and office even to the car without interruption.

Together with the spotlight of a telematics technology and the development of the telematics system, a variety of service contents satisfying a user's desire are being required.

SUMMARY OF THE INVENTION

Accordingly, the present invention is directed to a system and method for controlling a remote vehicle using a telematics system that substantially overcomes one or more of the limitations and disadvantages of the conventional art.

An object of the present invention is to provide a system and method for controlling a remote vehicle using a telematics system, in which the vehicle equipped with the telematics system can be diagnosed and checked in status using a communication terminal at a remote place, and its operation can be controlled depending on the diagnosed status.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a system for controlling a remote vehicle using a telematics system, the system including: a communication terminal for generating and transmitting a remote diagnosis service request signal upon reception of a remote diagnosis service request from a user, informing the user of vehicle diagnosis information upon reception of the vehicle diagnosis information responsive to the remote diagnosis service request signal, generating and transmitting a remote vehicle control request signal by the user confirming the vehicle diagnostic information, receiving a predetermined vehicle control list in response to the remote vehicle control request signal and transmitting vehicle control information, which includes at least one control command, among the vehicle control list, and informing the user of a vehicle control result received in response to the transmitted vehicle control information; a service providing center for receiving the remote diagnosis service request signal and transmitting a remote diagnosis request signal, transmitting the vehicle diagnostic information to the communication terminal upon reception of the vehicle diagnostic information responsive to the remote diagnosis request signal, receiving the remote vehicle control request signal and transmitting a control list to the communication terminal, transmitting the vehicle control information upon reception of the vehicle control information responsive to the transmitted control list, and transmitting the vehicle control result, which is received in response to the transmitted vehicle control information, to the communication terminal; and a telematics terminal for receiving the remote diagnosis request signal, diagnosing a car status to generate and transmit the vehicle diagnostic information to the service providing center, receiving and analyzing the vehicle control information, controlling the vehicle depending on the analyzed result, and generating and transmitting a vehicle control result message to the service providing center.

In another aspect of the present invention, there is provided a method for controlling a remote vehicle using a telematics system having a communication terminal, a service providing center and a telematics terminal and transmitting vehicle diagnostic information from the telematics terminal to the communication terminal through the service providing center, the method including the steps of: when a user inputs a control request for controlling a vehicle at a remote place, to the communication terminal, generating a remote control request signal in the communication terminal and transmitting the generated remote control request signal from the communication terminal to the service providing center; receiving the remote control request signal in the service providing center, and transmitting a vehicle control list from the service providing center to the communication terminal; receiving the vehicle control list and selecting any one of control items from the received vehicle control list in the communication terminal, and transmitting vehicle control information having the selected control item from the communication terminal to the telematics terminal through the service providing center; receiving and analyzing the vehicle control information and controlling a corresponding control part in the telematics terminal, and transmitting a control result from the telematics terminal to the communication terminal through the service providing center; and receiving the control result and informing the user of the received control result in the communication terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
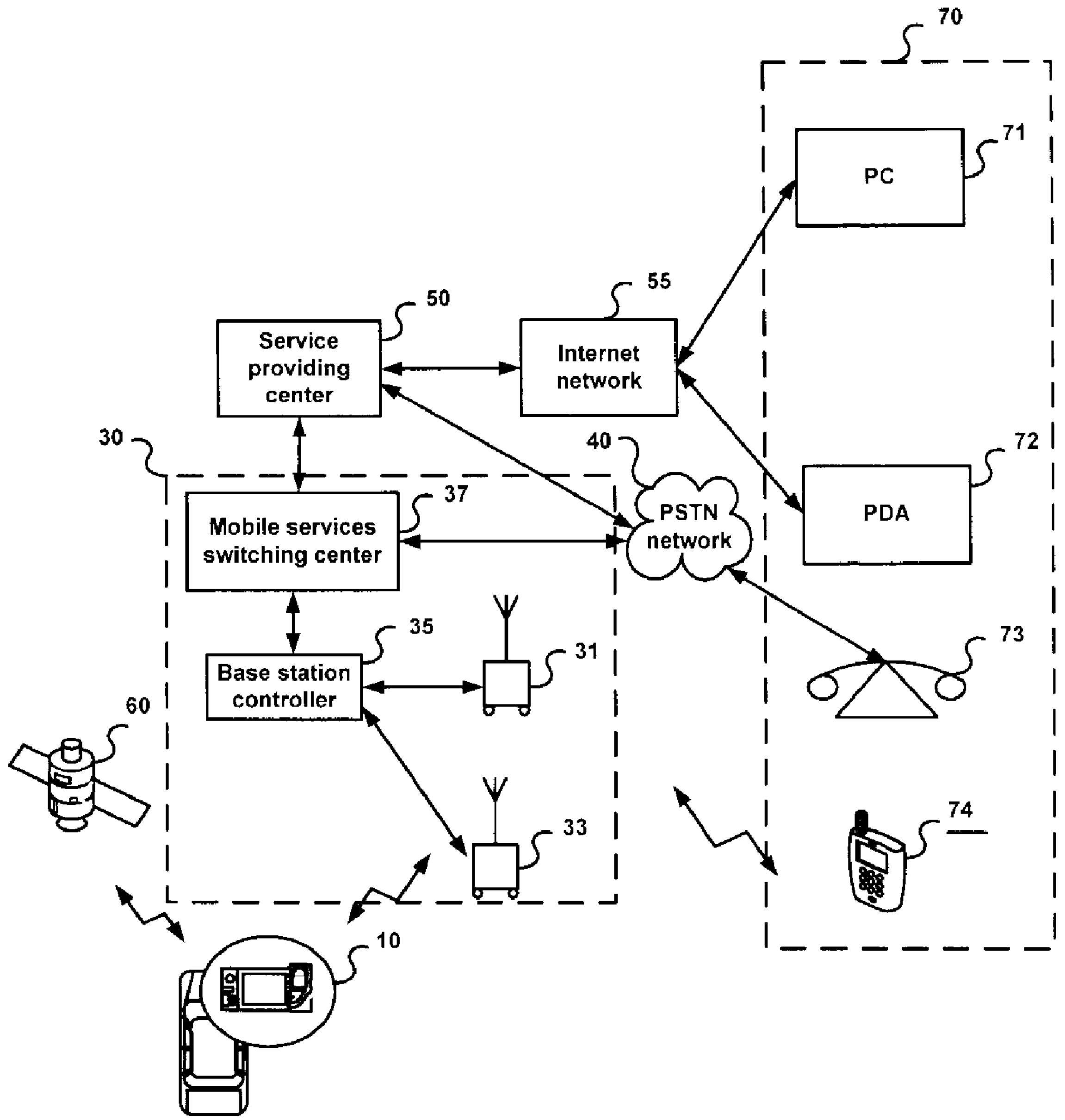
FIG. 1 illustrates a construction of a system for controlling a remote vehicle using a telematics system according to the present invention.

Reference will now be made in detail to the preferred embodiments of the present invention, examples of which are illustrated in the accompanying drawings. Wherever possible, the same reference numerals will be used throughout the drawings to refer to the same or like parts.

According to the present invention, a telematics system subscriber connects to a vehicle equipped with a telematics terminal, and diagnoses and checks a status of the vehicle, through a telematics system using a communication terminal at a remote place.

FIG. 1 illustrates a construction of a system for controlling the remote vehicle using the telematics system according to the present invention.

The inventive control system using the telematics system includes the telematics terminal 10, a mobile communication network 30, a Public Switching Telecommunication Network (PSTN) 40, a service providing center 50, an Internet network 55, and the communication terminal 70.

The telematics terminal 10 receives position information from an artificial satellite 60, maps the received position information to a previously stored map data, and displays a car's position on a displaying device such as a Liquid Crystal Display (LCD). Further, the telematics terminal 10 diagnoses a car status (that is, a status of a controller, such as an Electronic Control Unit (ECU) and a Transmission Control Unit (TCU) for controlling a electro-mechanic system and a multimedia system such as Audio/Video (AV) instrument navigation, statuses of car door, hood, trunk and window, and the like) through a sensor connected to a car's interior or exterior, and displays information on the diagnosed car status on the displaying device. Even when the telematics terminal 10 receives a remote diagnosis request signal from the service providing center 50 through the mobile communication network 30, it diagnoses the car status, collects the information on the diagnosed car status, and transmits the collected information to the service providing center 50 through the mobile communication network 30. The telematics terminal 10 can be connected with the mobile communication network 30 using a portable mobile communication terminal 10-1, or can be connected with the mobile communication network 30 using its internally installed wireless communication unit. Through the telematics terminal 10, the telematics system subscriber can receive traffic information through the mobile communication network 30, display the received traffic information on the LCD, and receive a service of information such as a current traffic situation.

The service providing center 40 is connected with the mobile communication network 30, the PSTN 40, and the Internet network 55. The service providing center 40 is wireless connected with the telematics terminal 10 through the mobile communication network 30, to receive the vehicle diagnostic information from the telematics terminal 10 and transmit the received vehicle diagnostic information to the telematics system subscriber through the mobile communication network 30, the PSTN 40 or the Internet network 55 connecting with the telematics system subscriber. The transmitted vehicle diagnostic information can be a character, a graphic icon, voice, and the like depending on a type of a communication network connecting with the subscriber. For example, in case where the subscriber connects to the service providing center 40 through the PSTN being a wire communication network, the vehicle diagnostic information can be the voice. In case where the subscriber connects to the service providing center 40 through a cell phone or a Portable Digital Assistants (PDA) being a mobile communication terminal, the vehicle diagnostic information can be the voice, the character, and/or the graphic icon. Further, the service providing center 40 should have a number of the telematics terminal of each remote vehicle diagnostic service subscriber, and an authentication password and/or a resident registration number for the telematics terminal, to authenticate the subscriber and allow the connection to the corresponding telematics terminal.

The communication terminal 70 can be any one of a Personal Computer (PC) 71 connecting to the service providing center 50 through the Internet network 55, the PDA 72 connecting to the service providing center 50 through the Internet network 55 or the mobile communication network 30, a line telephone set 73 connected to the service providing center 50 through the PSTN 40, and the cell phone 74 connecting to the service providing center 50 through the mobile communication network 30. According to the present invention, the communication terminal 70 receives the vehicle diagnostic information from the service providing center 50, and informs a user of the received vehicle diagnostic information through the LCD, a monitor or a speaker.

Figure 2:
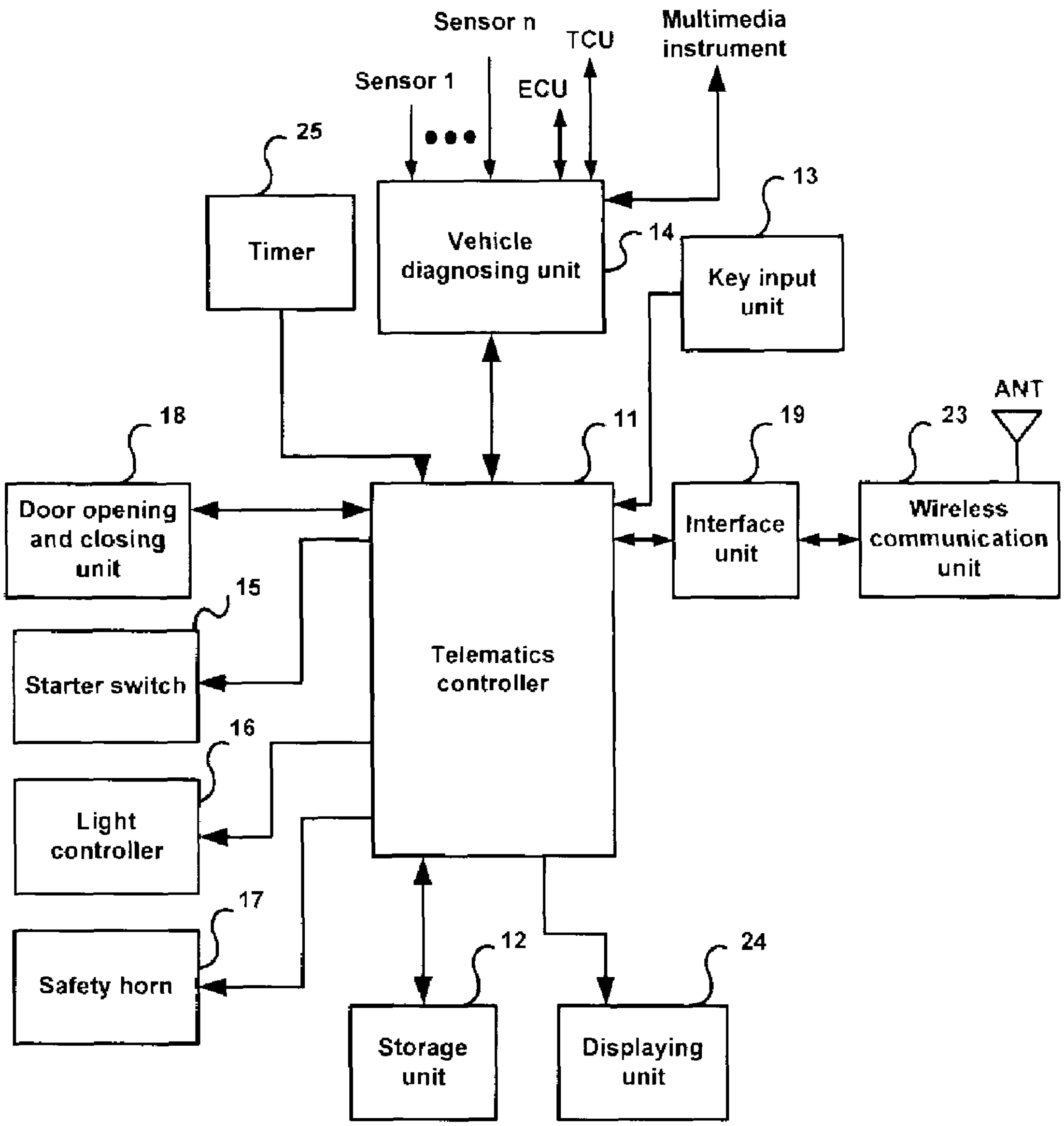
FIG. 2 illustrates a construction of a telematics terminal according to the present invention.

FIG. 2 illustrates a construction of the telematics terminal according to the present invention.

Referring to FIG. 2, a construction and an operation of the telematics terminal will be described below.

The telematics terminal 10 includes a telematics controller 11, a storage unit 12, a key input unit 13, a vehicle diagnosing unit 14, a starter switch 15, a light controller 16, a safety horn 17, a door opening and closing unit 18, an interface unit 19, a map database 21, the wireless communication unit 23, a displaying unit 24, and a timer 25. In case where the wireless communication unit 23 is of a type internally installed, the interface unit 19 is not required.

The telematics controller 11 controls a general operation of the telematics terminal 10. The storage unit 12 includes a region for storing a control program for controlling the operation of the telematics terminal 10; a region for temporarily storing data, which is generated during the execution of the control program; and a region for storing a user data such as the vehicle diagnostic information and the authentication password, which is used for authentication when remote diagnosis is requested.

The key input unit 13 includes a plurality of alphanumeric keys, function keys, mode keys, end keys, and the like, and generates key data for the keys. The vehicle diagnosing unit 14 detects a status signal of each constituent part of the car from a plurality of sensors, which are positioned at exterior or interior constituent parts of the car, and transmits the detected status signal to the telematics controller 11. The vehicle diagnosing unit 14 can receive the status signal in a direct connection with the plurality of sensors, or can receive the status signal or the vehicle diagnostic information of each constituent part of the car through the ECU or TCU connected with the plurality of sensors. The vehicle diagnosing unit 14 transmits a diagnosis request signal for requesting to diagnose the car status, to the ECU and the TCU, and receives the status signal or the vehicle diagnostic information through the ECU and TCU. The ECU and the TCU diagnose the car status in response to the diagnosis request signal, and transmits the diagnosed car status to the vehicle diagnosing unit 14. The sensors can be exemplified as a collision sensor for sensing the collision at a front or rear of the car, an airbag sensor for sensing the activation of the airbag when a sensed value of the collision sensor is larger than a predetermined value, a sensor for checking an amount of car's oil, and a sensor for sensing the opening or closing of the window, the door, and the trunk. Further, the vehicle diagnosing unit 14 is connected with a multimedia instrument such as an AV instrument, to diagnose the multimedia instrument. The vehicle diagnosing unit 14 receives and collects the car status signals or the vehicle diagnostic information, and outputs the collected status signals or vehicle diagnostic information to the telematics controller 11.

The collected vehicle diagnostic information is transmitted to the mobile communication network 30 through the wireless communication unit 23 under the control of the telematics controller 11.

The displaying unit 24 displays a variety of information, such as operation mode and state of the telematics system, and the car status, in a graphic or text format, under the control of the telematics controller 11. The displaying unit 24 can employ the LCD and the like.

The timer 25 counts a time, and provides information on the counted time to the telematics controller 11.

The interface unit 19 is connected with a Universal Asynchronous Receiver and Transmitter (UART)(not shown) of the wireless communication unit 23, and wireless connects the telematics terminal 10 with a base station 33 of FIG. 1. In case where the wireless communication unit 23 is of a type internally installed, the telematics terminal 10 can be configured without the interface unit 19.

The starter switch 15 supplies a power to the vehicle, or starts an engine of the powered vehicle under the control of the telematics controller 11. When the car status is diagnosed, the telematics terminal 10 and the vehicle should be in a powered state. Therefore, the telematics controller 11 should control the starter switch 15 to supply the power to the vehicle and start the engine of the powered vehicle.

The safety horn 17 sounds a safety horn, that is, a horn under the control of the telematics controller 11. The safety horn 17 employs a digital safety horn, to be activated under the control of the telematics controller 11.

The light controller 16 turns on/off car lights, such as a taillight, a headlight, and an emergency light, under the control of the telematics controller 11.

The door opening and closing unit 18 opens and closes a variety of doors, for example, the car door, trunk and window, under the control of the telematics controller 11.

The present invention can apply two methods for controlling the vehicle below.

The first method is to control the light, the door, the safety horn 17 and the engine start, using the vehicle diagnosing unit 14. The second method is to separately install and directly control the starter switch 15, the light controller 16, the safety horn 17 and the door opening and closing unit 18, using the telematics controller 11.

In the first method, the car diagnosing unit 14 can control the TCU and the ECU under the control of the telematics controller 11, to control the on/off of a fog light, the taillight, the emergency light and the engine start, and the opening and closing of the car window and door.

According to the present invention, even when a car key is removed, a minimal power should be supplied to the telematics controller 11, the wireless communication unit 23, and the interface unit 19 in order to enable the telematics terminal 10.

Or, when the telematics terminal 10 receives the remote diagnosis request signal through the wireless communication unit 23 and the interface unit 19 while activating the telematics controller 11, the wireless communication unit 23 and the interface unit 19 with the supplied minimal power, the power can be also supplied to each of the constituent parts of the car.

Figure 3:
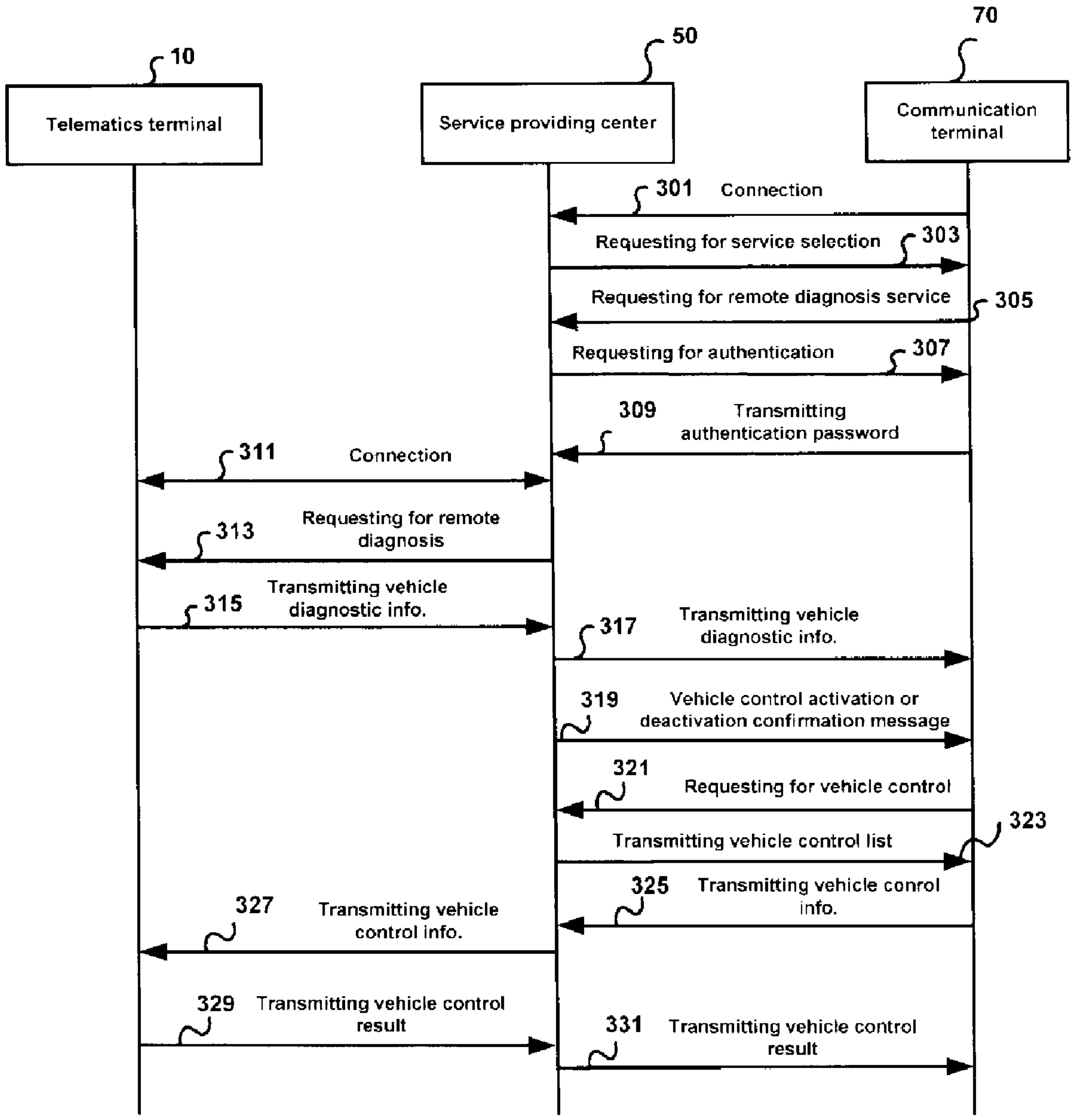
FIG. 3 is a flowchart illustrating a method for controlling a remote vehicle using a telematics system according to the first embodiment of the present invention.

FIG. 3 is a flowchart illustrating a method for controlling the remote vehicle using the telematics system according to the first embodiment of the present invention.

Referring to FIGS. 1 to 3, the inventive method for diagnosing the vehicle at the remote place will be described below.

The telematics system subscriber should subscribe to the service providing center 50 for a remote vehicle diagnosis service. The service providing center 50 should receive information on whether or not the user subscribes for the remote vehicle diagnosis service, and an inherent authentication password from the subscriber. When the communication terminal 70 is the line telephone set 73, the inherent authentication password can be a numeric password. When the communication terminal 70 is the PC 71, the PDA 72, and the portable phone 74, the inherent authentication password can be an IDentification (ID) and a password such as a numeral or a character. When the communication terminal 70 is the line telephone set 73, the service providing center 50 uses an Automatic Response System (ARS). It is desirable that additional authentication information such as a resident registration number is requested using the ARS, to reinforce safety.

When the communication terminal 70 receives a service providing center connection command from the subscriber, it connects to the service providing center 50 in Step 301. When the communication terminal 70 is the line telephone set 73, the connection command can be a telephone number of the service providing center 50. When the communication terminal 70 is the Internet, the connection command can be a service request command on a homepage of the service providing center 50.

When the communication terminal 70 connects to the service providing center 50, the service providing center 50 transmits a service selection request signal from in-services in Step 303. The service selection request signal can have a graphic or text format and a voice format, depending on a type of the communication terminal 70. The communication terminal 70 receives the service selection request signal, and checks whether or not to select one of a plurality of services. If it is checked that the vehicle diagnosis service is selected, the communication terminal 70 transmits the remote diagnosis request signal to the service providing center 50 through the corresponding network in Step 305. Then, in Step 307, the service providing center 50 transmits an authentication request signal to the communication terminal 70 to determine whether or not the subscriber, who uses the communication terminal 70 transmitting the diagnosis service request signal, is registered. The communication terminal 70 receives the authentication request signal, receives the authentication password from the subscriber, and transmits the received authentication password to the service providing center 50 in Step 309.

The service providing center 50 receives the authentication password, and compares the received authentication password with a previously stored authentication password and determines whether or not they are the same. If it is determined that they are the same, the service providing center 50 connects to the telematics terminal 10 for the subscriber in Step 311. At this time, a request for the connection is performed by the service providing center 50. It is desirable that the service providing center 50 has an inherent number for distinguishing itself from others.

Only when the telematics terminal 10 receives an incoming call having its own number including the inherent number, it forms a communication path and connects with the service providing center 50.

If the service providing center 50 connects to the telematics terminal 10, it transmits the remote diagnosis request signal for requesting the remote diagnosis, to the telematics terminal 10 in Step 313. Then, the telematics terminal 10 diagnoses the car status through the vehicle diagnosing unit 14, receives the vehicle diagnostic information, and transmits the received vehicle diagnostic information to the service providing center 50 in Step 315.

The service providing center 50 receives the vehicle diagnostic information from the telematics terminal 10, converts the received vehicle diagnostic information suitably to the communication terminal 70, which has requested the remote vehicle diagnosis service, and transmits the converted vehicle diagnostic information to the communication terminal 70 in Step 317. For example, when the communication terminal 70 is the line telephone set 73, the service providing center 50 converts text data of the vehicle diagnostic information into voice data, and transmits the converted voice data to the telematics terminal 70. When the communication terminal is the PC 71, the PDA 72 or the cell phone 74, the service providing center 50 converts the vehicle diagnostic information into the text or graphic, and transmits the converted text or graphic to the telematics terminal 70.

The communication terminal 70 receives the vehicle diagnostic information, and informs the subscriber of the vehicle diagnostic information in voice, text and/or graphic.

After that, in Step 319, the service providing center 50 transmits to the communication terminal 70 a vehicle control activation or deactivation confirmation message for confirming whether or not vehicle control based on the vehicle diagnosis is activated.

Then, the communication terminal 70 receives the vehicle control activation or deactivation confirmation message, and informs the subscriber of the received confirmation message. At this time, when the subscriber confirms the car status in his/her naked eyes, and determines that the car status is abnormal, he/she inputs a vehicle control request command for controlling the vehicle, to the communication terminal 70. Then, the communication terminal 70 generates a vehicle control request signal, and transmits the generated vehicle control request signal to the service providing center 50 in Step 321.

The service providing center 50 receives the vehicle control request signal, and transmits a list for controllable vehicle functions, for example, a control list for the control of the light, the opening and closing of the door, the on/off of the engine start, and the like, to the communication terminal 70 in Step 323.

The communication terminal 70 receives the control list in Step 323, and informs the subscriber of the received control list. If the subscriber selects a specific control item from the control list, the communication terminal 70 transmits vehicle control information on the selected control item to the service providing center 50 in Step 325. Then, the service providing center 50 receives and transmits the vehicle control information to the telematics terminal 10 in Step 327.

The telematics terminal 10 analyzes the received vehicle control information and controls a corresponding function using the telematics controller 11, and transmits a control result of the corresponding function to the service providing center 50 in Step 329.

Then, the service providing center 50 transmits the control result to the communication terminal 70 in Step 331.

Further, even though the service providing center 50 or the telematics terminal 10 has been already authenticated in the remote vehicle diagnosis service, when controlling the remote vehicle, it can be additionally authenticated for safety, separately from the authentication of the remote vehicle diagnosis service.

Figure 4:
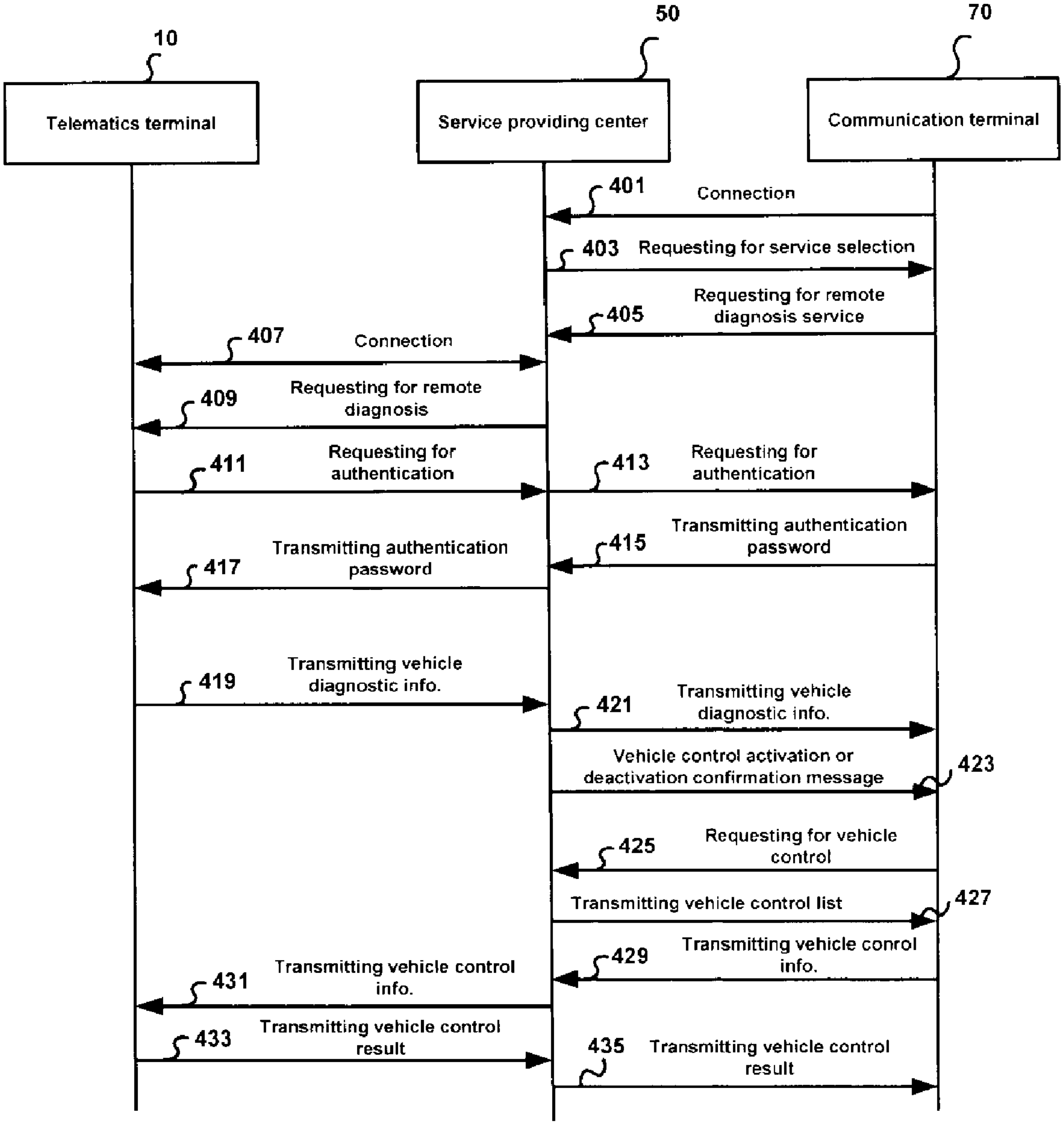
FIG. 4 is a flowchart illustrating a method for controlling a remote vehicle using a telematics system according to the second embodiment of the present invention.

FIG. 4 is a flowchart illustrating a method for controlling the remote vehicle using the telematics system according to the second embodiment of the present invention.

The first embodiment illustrate a case where the authentication is performed in the service providing center 50, and the second embodiment illustrates a case where the authentication is performed in the telematics terminal 10.

Steps 401 to 405 of FIG. 4 are the same as the corresponding Steps 301 to 305 of FIG. 3. If the service providing center 50 receives the remote diagnosis request signal from the communication terminal 70 in Step 405, the service providing center 50 connects to the telematics terminal 10 in Step 407. If the service providing center 50 connects to the telematics terminal 10 in the Step 407, it transmits the remote diagnosis request signal to the telematics terminal 10 in Step 409. The telematics terminal 10 receives the remote diagnosis request signal, and transmits an authentication request signal to the service providing center 50 in Step 411.

The service providing center 50 receives the authentication request signal, converts the received authentication request signal into an authentication request signal suitable to the communication terminal 70, and transmits the converted authentication request signal to the communication terminal 70 in Step 413. The communication terminal 70 receives the authentication request signal, and transmits the authentication password to the service providing center 50 in response to the received authentication request signal in Step 415. If so, the service providing center 50 transmits the authentication password to the telematics terminal 10 in Step 417.

The telematics terminal 10 receives the authentication password, and collects and transmits the vehicle diagnostic information to the service providing center 50 in Step 419. Then, the service providing center 50 receives the vehicle diagnostic information, converts the received vehicle diagnostic information into vehicle diagnostic information suitably to the communication terminal 70, and transmits the converted vehicle diagnostic information to the communication terminal 70 in Step 421.

If the vehicle diagnostic information is inputted to the communication terminal 70 as described above, the vehicle is controlled in Steps 423 to 435. The Steps 423 to 435 each corresponding to the Steps 319 to 331 are sequentially performed to control the vehicle at the remote place. The steps 423 to 435 of FIG. 4 perform the same operations as the steps 319 to 331 of FIG. 3 and therefore, their descriptions will be omitted.

The line telephone set 73 provides the vehicle diagnostic information using the ARS. The cell phone 74, the PC 71 or the PDA 72 provides the vehicle diagnostic information in text or graphic, through a data communication using the ARS or the wireless communication network. In the above description, the voice is provided using the ARS. However, the voice can be provided using a counselor instead of the ARS.

Further, in the above description, the communication terminal 70 controls the vehicle at the remote place after receiving the vehicle diagnostic information. However, when service selection is requested in the Step 303 or 403 and the remote vehicle control service is selected, a remote control service can be also requested in the Step 305 or 405 to control the vehicle in the Steps subsequent to the Steps of 305 and 405. However, the Steps 317 and 319 of FIG. 3 and the Steps 421 and 423 of FIG. 4 should be omitted.

As described above, the present invention has an advantage in that since a car owner can diagnose the vehicle at the remote place, he/she can check the current car status everywhere and control the vehicle at the remote place, thereby providing convenience to the car owner, and even when the car owner gets off and moves away from the car, he/she can manage the car with an easy mind.

Further, the present invention has an advantage in that the car owner can quickly cope with a car trouble and a car theft caused by leaving the vehicle with the variety of doors unlocked, and even when the owner leaves the vehicle with the car light turned on, a car battery can be prevented from the discharge by turning off the car light through the remote control.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A system for controlling a remote vehicle using a telematics system, the system comprising:

a communication terminal for generating and transmitting a remote diagnosis service request signal upon reception of a remote diagnosis service request from a user, informing the user of vehicle diagnosis information upon reception of the vehicle diagnosis information responsive to the remote diagnosis service request signal, generating and transmitting a remote vehicle control request signal by the user confirming the vehicle diagnostic information, receiving a predetermined vehicle control list in response to the remote vehicle control request signal and transmitting vehicle control information, which includes at least one control command, among the vehicle control list, and informing the user of a vehicle control result received in response to the transmitted vehicle control information;

a service providing center for receiving the remote diagnosis service request signal and transmitting a remote diagnosis request signal, transmitting the vehicle diagnostic information to the communication terminal upon reception of the vehicle diagnostic information responsive to the remote diagnosis request signal, receiving the remote vehicle control request signal and transmitting a control list to the communication terminal, transmitting the vehicle control information upon reception of the vehicle control information responsive to the transmitted control list, and transmitting the vehicle control result, which is received in response to the transmitted vehicle control information, to the communication terminal; and a telematics terminal for receiving the remote diagnosis request signal, diagnosing a car status to generate and transmit the vehicle diagnostic information to the service providing center, receiving and analyzing the vehicle control information, controlling the vehicle depending on the analyzed result, and generating and transmitting a vehicle control result message to the service providing center.

2. The system according to claim 1, wherein the service providing center stores a number and an authentication password of the telematics terminal, requests the communication terminal for authentication when receiving a remote control request signal from the communication terminal, receives an authentication password in response to the authentication request, compares the received authentication password with the stored authentication password, and performs the authentication depending on a comparison result.

3. The system according to claim 1, wherein the telematics terminal has its inherent authentication password, requests the communication terminal for authentication through the service providing center when receiving the remote diagnosis service request signal from the communication terminal, receives an authentication password in response to the authentication request, compares the received authentication password with the inherent authentication password, and performs the authentication depending on a comparison result.

4. The system according to claim 1, wherein the communication terminal is a line telephone set.

5. The system according to claim 4, wherein the vehicle diagnostic information transmitted from the service providing center to the communication terminal is voice.

6. The system according to claim 5, wherein the voice is provided from an ARS (Automatic Response System).

7. The system according to claim 1, wherein the communication terminal is a cell phone.

8. The system according to claim 7, wherein the vehicle diagnostic information transmitted from the service providing center to the communication terminal is voice.

9. The system according to claim 7, wherein the vehicle diagnostic information transmitted from the service providing center to the communication terminal is a text.

10. The system according to claim 7, wherein the vehicle diagnostic information transmitted from the service providing center to the communication terminal is a graphic.

11. The system according to claim 1, wherein the communication terminal is a PC (Personal Computer).

12. The system according to claim 11, wherein the vehicle diagnostic information transmitted from the service providing center to the communication terminal is voice.

13. The system according to claim 11, wherein the vehicle diagnostic information transmitted from the service providing center to the communication terminal is a text.

14. The system according to claim 11, wherein the vehicle diagnostic information transmitted from the service providing center to the communication terminal is a graphic.

15. A method for controlling a remote vehicle using a telematics system having a communication terminal, a service providing center and a telematics terminal and transmitting vehicle diagnostic information from the telematics terminal to the communication terminal through the service providing center, the method comprising the steps of:

when a user inputs a control request for controlling a vehicle at a remote place, to the communication terminal, generating a remote control request signal in the communication terminal and transmitting the generated remote control request signal from the communication terminal to the service providing center;

receiving the remote control request signal in the service providing center, and transmitting a vehicle control list from the service providing center to the communication terminal;

receiving the vehicle control list and selecting any one of control items from the received vehicle control list in the communication terminal, and transmitting vehicle control information having the selected control item from the communication terminal to the telematics terminal through the service providing center;

receiving and analyzing the vehicle control information and controlling a corresponding control part in the telematics terminal, and transmitting a control result from the telematics terminal to the communication terminal through the service providing center; and receiving the control result and informing the user of the received control result in the communication terminal.

16. The method according to claim 15, wherein the service providing center stores a number and an authentication password of the telematics terminal, requests the communication terminal for authentication when receiving a remote diagnosis service request signal from the communication terminal, receives an authentication password in response to the authentication request, compares the received authentication password with the stored authentication password, and performs the authentication depending on a comparison result.

17. The method according to claim 15, wherein the telematics terminal has its inherent authentication password, requests the communication terminal for authentication through the service providing center when receiving a remote diagnosis service request signal from the communication terminal, receives an authentication password in response to the authentication request, compares the received authentication password with the inherent authentication password, and performs the authentication depending on a comparison result.

18. The method according to claim 15, wherein the communication terminal is a line telephone set.

19. The method according to claim 18, wherein the vehicle diagnostic information transmitted from the service providing center to the communication terminal is voice.

20. The method according to claim 19, wherein the voice is provided from an ARS (Automatic Response System).

21. The method according to claim 15, wherein the communication terminal is a cell phone.

22. The method according to claim 21, wherein the vehicle diagnostic information transmitted from the service providing center to the communication terminal is voice.

23. The method according to claim 21, wherein the vehicle diagnostic information transmitted from the service providing center to the communication terminal is a text.

24. The method according to claim 21, wherein the vehicle diagnostic information transmitted from the service providing center to the communication terminal is a graphic.

25. The method according to claim 15, wherein the communication terminal is a PC (Personal Computer).

26. The method according to claim 25, wherein the vehicle diagnostic information transmitted from the service providing center to the communication terminal is voice.

27. The method according to claim 25, wherein the vehicle diagnostic information transmitted from the service providing center to the communication terminal is a text.

* * * * *